United States Patent
Minear et al.

(10) Patent No.: US 6,721,578 B2
(45) Date of Patent: Apr. 13, 2004

(54) SYSTEM AND METHOD FOR PROVIDING AN INTERACTIVE SCREEN ON A WIRELESS DEVICE INTERACTING WITH A SERVER

(75) Inventors: Brian Minear, San Diego, CA (US); Mazen Chmaytelli, San Diego, CA (US); Mitchell B. Oliver, San Diego, CA (US); Stephen A. Sprigg, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/061,635

(22) Filed: Jan. 31, 2002

(65) Prior Publication Data

US 2003/0143990 A1 Jul. 31, 2003

(51) Int. Cl.$^7$ .................................................. H04Q 7/20
(52) U.S. Cl. ......................... 455/566; 455/411; 455/418
(58) Field of Search ................................. 455/407, 408, 455/410, 411, 420, 566, 418, 419; 370/395.21, 395.3, 395.4, 395.41, 395.42, 395.43, 395.5, 395.53, 395.52, 395.54, 401; 709/217, 218, 220; 707/10; 713/200, 201, 202; 715/526; 345/744, 748, 749, 733

(56) References Cited

U.S. PATENT DOCUMENTS

| | | | | | |
|---|---|---|---|---|---|
| 6,185,682 B1 | * | 2/2001 | Tang | ............................ | 713/168 |
| 6,336,101 B1 | * | 1/2002 | Dean et al. | .................... | 705/29 |
| 6,356,543 B2 | * | 3/2002 | Hall et al. | ................... | 370/352 |
| 6,473,609 B1 | * | 10/2002 | Schwartz et al. | ........... | 455/406 |
| 6,493,751 B1 | * | 12/2002 | Tate et al. | .................... | 709/221 |
| 2002/0013829 A1 | * | 1/2002 | Kishimoto | ................... | 709/219 |
| 2002/0072355 A1 | * | 6/2002 | Jeong et al. | ................. | 455/419 |
| 2002/0090986 A1 | * | 7/2002 | Cote et al. | ..................... | 463/16 |
| 2002/0095456 A1 | * | 7/2002 | Wensheng | ................... | 709/203 |
| 2002/0123336 A1 | * | 9/2002 | Kamada | ...................... | 455/420 |
| 2002/0160752 A1 | * | 10/2002 | Hook et al. | .................. | 455/412 |
| 2003/0041125 A1 | * | 2/2003 | Salomon | ..................... | 709/220 |

\* cited by examiner

Primary Examiner—Jean Gelin
(74) Attorney, Agent, or Firm—Philip B. Wadsworth; Robert J. O'Connell (57) ABSTRACT

A system and method for displaying an interactive screen, such as an end-user license agreement or verification form, on the graphic display of a wireless device when the wireless device connects to a network server on a wireless network and attempts to access or download software applications and data. The user of the wireless device must then affirmatively interact with the interactive screen in order to access or download a software application or data from the network server. The interactive screen can be transmitted from the network server where the wireless device seeks to access or download an application or data, or can be transmitted from a separate server to the wireless device. The records of the wireless device-server interactions can be stored on a network server or other data stores on the wireless network.

6 Claims, 5 Drawing Sheets

SYSTEM AND METHOD FOR PROVIDING AN INTERACTIVE SCREEN ON A WIRELESS DEVICE INTERACTING WITH A SERVER

BACKGROUND OF THE INVENTION

I. Field of the Invention

The present invention generally relates to wireless networks and computer communications across wireless networks. More particularly, the invention relates to the provision of an interactive screen on the display of a wireless device when the wireless device attempts to access or download a software application or data from a network server wherein the user of the wireless device must interact with the interactive screen in order to access or download the requested application or data.

II. Description of the Related Art

Wireless devices, such as cellular telephones, communicate packets including voice and data over a wireless network. Cellular telephones themselves are being manufactured with increased computing capabilities and are becoming tantamount to personal computers and handheld personal digital assistants ("PDAs"). Some wireless devices, such as select cellular telephones, may have an installed application programming computer platform that allows software developers to create software applications that operate on the wireless device.

On the Internet and other open networks, it is known to provide a user of a computer an interactive form when the user seeks to download or access software applications or data, such as an end-user license agreement (EULA), release, or verification form as to age, location or non-commercial status, prior to letting the user download the application. The user then must interact with the form, which sends a confirming signal back to the application download server, and then the user is given access to the application desired downloaded. However, the Internet and most LAN or WAN networks are wire-based or otherwise have inexpensive data connectivity such that bandwidth is easily available to provide interactivity between the browsing computer and the application download server. Thus, the transmission of the end-user license agreement or other verification forms and return of the confirming data does not take up significant network resources. Conversely, in a wireless network environment such as cellular telecommunications, any network connection for data transfer is expensive and the use of a user-interactive form to traverse the network prior to application download has traditionally been prohibitive.

Consequently, it is desirable to provide an interactive mechanism to a wireless device by which the user of the wireless device must interact prior to accessing data over a network. Such a mechanism needs to account for the limited bandwidth and other characteristics associated with the wireless network.

SUMMARY OF THE INVENTION

One aspect of the present invention includes one or more wireless devices where each wireless device has a computer platform and a graphic display, and the graphic display is operated by the resident driver of the computer platform that can be hardware, firmware, or software. Examples of the wireless device include cellular telephones, text pagers, personal digital assistants (PDAs), or other computer platforms with a wireless link to selectively communicate with a wireless network. The system also includes one or more network servers, such as specific application download servers, that are on the wireless network and each network server is selectively in communication with the one or more wireless devices and selectively downloading data thereto, such as software applications, graphics, and text.

If an interactive screen is sent to the wireless device from the second network server that requires the user to input data at the wireless device, then upon the user of the wireless device inputting data on the interactive screen displayed on the graphic screen of the wireless device, the wireless device sends the input data to the second network server, and the second network server sends a signal to the first network server indicating the input of data at the wireless device, and the second server downloading the requested data to the computer platform of the wireless device. Any user input data can be processed the by the receiving network server to determine if the requested download or access is permitted, such as an age verification or other consumer information.

The present invention also provides a method for displaying an interactive screen on the graphic display of a user-interactive wireless devices including attempting to download or access data or applications on the network server from a wireless device across the wireless network, transmitting a interactive screen to the computer platform of the wireless device across the wireless network prior to downloading or accessing the requested data, and displaying the interactive screen on the graphic display of the wireless device. Attempting to download data to the wireless device from the network server across the wireless network can include attempting to download a specific software application to the wireless device, or can include downloading simple data.

The method can further include interacting with the interactive screen at the wireless device, sending a signal to the network server from the wireless device indicating the interaction, and downloading or accessing the requested data on the network server. Transmitting an interactive screen to the wireless device across the wireless network can include transmitting an interactive screen from a first network server that the wireless device requested the application or data from, or can include transmitting an interactive screen from a second network server to the wireless device across the wireless network If the system is embodied with an interactive screen that allows user input of data at the wireless device, the method further includes inputting data on the interactive screen displayed on the graphic screen of the wireless device, sending the inputted data from the wireless device to the network server, processing the input data at the network server, and selectively downloading or accessing the requested data on the network server. And if the system has a second network server transmitting the interactive screen to the wireless device, the method further includes interacting with the interactive screen displayed on the graphic screen of the wireless device, sending a signal from the wireless device to the second network server indicating the interaction, sending a signal from the second network server to the first network server indicating the interaction at the wireless device, and downloading or accessing the requested data on the first network server.

An embodiment also includes a wireless device that can perform the above function in providing an interactive screen to the wireless device, and interacting with the network server(s) to access or download data resident the applications or data made available to the wireless device. Because the inventive method is executable on the computer platform of the wireless device, the invention include a program, in a computer readable medium, that directs a wireless device having a computer platform and a graphic display to perform the steps of the method.

Objects, advantages, and features of the present invention will become apparent after review of the hereinafter set forth Brief Description of the Drawings, Detailed Description of the Invention, and the claims.

DETAILED DESCRIPTION OF THE INVENTION

Introduction

Systems and methods are anticipated that provide for the downloading of software applications to a wireless device. Software applications can come pre-loaded at the time the wireless device is manufactured, or the user may later request that additional programs be downloaded over cellular telecommunication carrier networks, where the programs are executable on the wireless device. As a result, users of wireless devices can customize their wireless devices with programs, such as games, printed media, stock updates, news, or any other type of information or program available for download from application download servers through the wireless network.

In one scenario, if the user of the wireless device desires to download and use a software application using the wireless network, the user will typically either call a service provider or contact the service provider through other means, such as through an Internet access, and the service provider will either transmit the application to the wireless device across the wireless network or allow the user access a network site where the application is downloadable or accessible. To connect to the application download server, the wireless device bridges a communication connection to the wireless network, such as a cellular network, and then attempts to contact an application download server where the desired software application is resident. Once the wireless device contacts the application download server, an initial connection is made and the application download server determines what application are available to the wireless device and sends the appropriate information, such as a menu, for display on the wireless device so the user can learn of the available applications. Once access is provided to the downloadable applications, the user of the wireless device can download any of the available applications.

The present invention provides systems and methods for providing an interactive screen on the graphic display of a wireless device when the wireless device attempts to download or access data or applications on a network server, such as an application download server, across a wireless network. The interactive screen allows the limited access of individual applications and data on the network server. The interactive screen can be transmitted to the wireless device from first network server that the wireless device computer platform is attempting to navigate, or the interactive screen can be transmitted to the wireless device from a second server on the wireless network. The interactive screen can include graphics, text, multimedia components, data entry fields, or hyperlinks, all of which are displayable and interactive on the graphic display of the wireless device, and the system requires the end-user to properly interact with the screen in order to download or access the requested applications or data.

Examples of the interactive screen are EULAs which require the end-user to agree to certain terms before being allowed to download a software application, or a verification form that requires the end-user to input data in order to have the requested access to the applications or data on the network server. Once the user of the wireless device interacts with the interactive screen displayed on the graphic display of the wireless device in the proper predefined manner, the wireless device sends a signal to the first or second network server indicating the proper interaction, and the first network server will then allow the access or download of the requested application or data to the computer platform of the wireless device. When a second network server has provided the interactive screen to the wireless device, the second network server can also receive the interaction data from the wireless device and relay the interaction data to the first network server whereby the first network server then allows the download of the requested data to the computer platform of the wireless device.

It is therefore one object of the present inventive system and method to provide an interactive screen that can be displayed to the user of a wireless device seeking to download or access a specific application and data on a network server, such as an application download server. The interactive screen the operator of the network server the ability to selectively control the access the user of the wireless device has to the network server resident applications, and force users to enter EULAs or input data before being allowed to access the applications and data. With the use of a separate network server that can provide the interactive screen to the wireless device and store the interaction records, the system can conserve bandwidth and resources of the wireless network while controlling access to the applications and data of other network servers. The present invention thus provides an advantage in that it gives an operator of a network server the ability to have wireless device users execute agreements or verify facts prior to granting the user the ability to download or access applications and data resident on the application download or network server without significant use of the bandwidth and resources of the wireless network and network servers.

Exemplary Embodiments of the Present Invention

Figure 1:
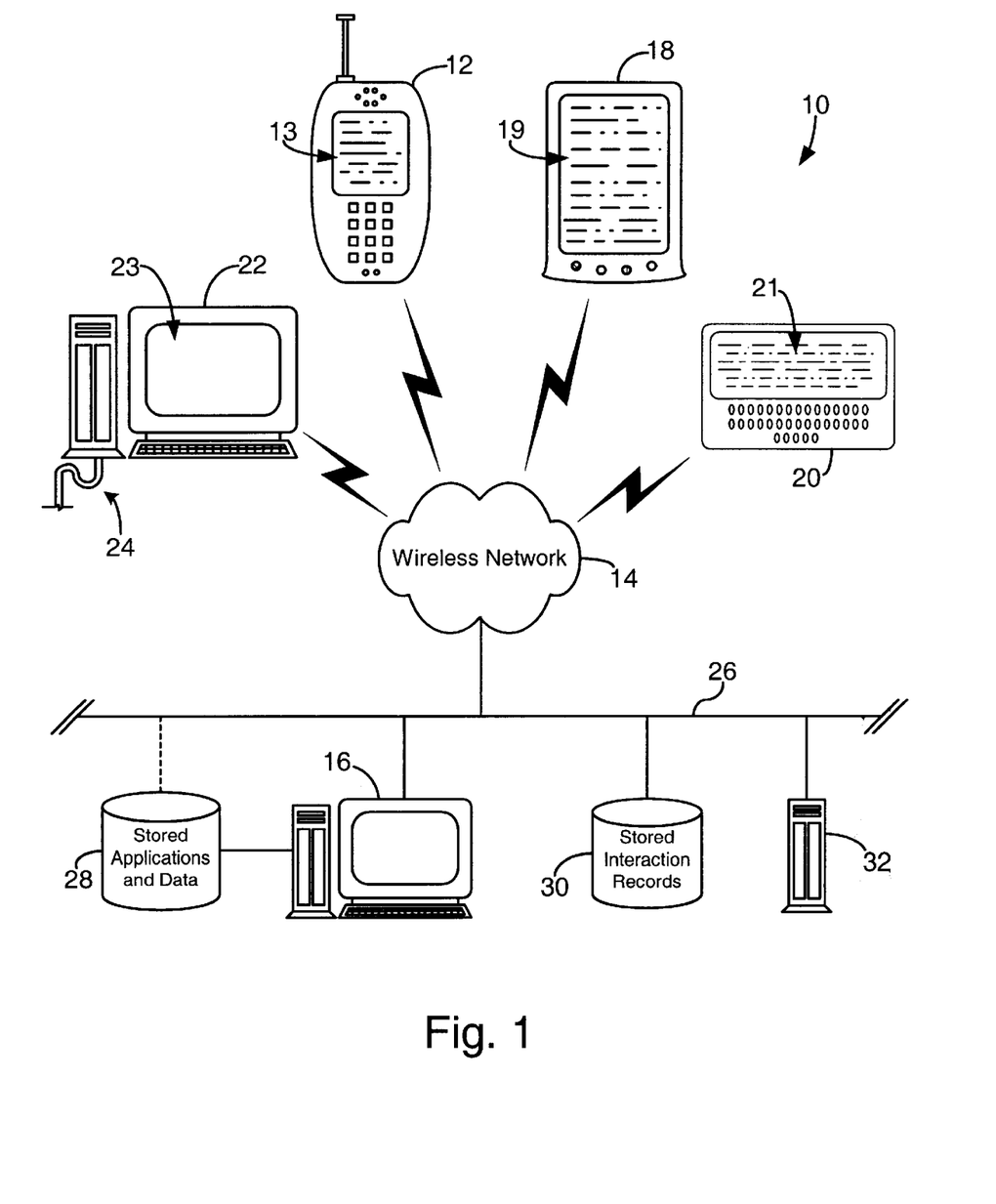
FIG. 1 is a representative diagram of a wireless network and the computer hardware and wireless devices that can be used within the system to provide an interactive screen to the wireless devices.

With reference to the figures in which like numerals represent like elements throughout, FIG. 1 illustrates an embodiment of a system 10 for providing subscribed software applications to one or more wireless devices, such as cellular telephone 12, in communication across a wireless network 14 with at least one network server, such as application download server 16, that selectively downloads or provided access to software applications or other data to the wireless devices across a wireless communication portal or other data access to the wireless network 14. As shown here, the wireless device can be a cellular telephone 12, with a graphics display 13, a personal digital assistant 18 with PDA screen 19, a pager 20 with a graphics display 21, which is shown here as a two-way text pager, or even a separate computer platform 22 that has a wireless communication portal and a display 23, and may otherwise have a wired connection 24 to a network or the Internet. The system 10 can thus be performed on any form of remote computer module including a wireless communication portal, including without limitation, wireless modems, PCMCIA cards, access terminals, personal computers, access terminals, telephones without a display or keypad, or any combination or sub-combination thereof.

The application download server 16 is shown here on a local server-side network 26 with other computer elements in communication with the wireless network 14, such as a database 28 with stored applications and data that contains software applications and data that are accessible and downloadable to the wireless devices 12,18,20,22. There is also shown a second network server which is an interactive screen server 32 and with stored interaction database 30. In such embodiment, the interactive screen server 32 transmits the interactive screen to the wireless device 12,18,20,22 as below described, and the stored interaction records database 30, which can be resident on the interactive screen server 32, stores the individual records for the interactions with the wireless devices that the interactive screen was provided to, the data input by the end-user, and any other interaction related data. Through the separate interactive screen server 32 and stored interaction records database 30, many other network servers, such as application download server 16, can have the system 10 provide the interactive screens to control access to network server resident applications and data without significant use of the network server resources. However, interactive screen server 32 and stored interaction record database 30 are not necessary as server-side functions can be performed on one server, such as application download server 16. Further, a computer server-side computer platform can provide separate services and processes to the wireless devices 12,18,20,22 across the wireless network 14.

Figure 2:
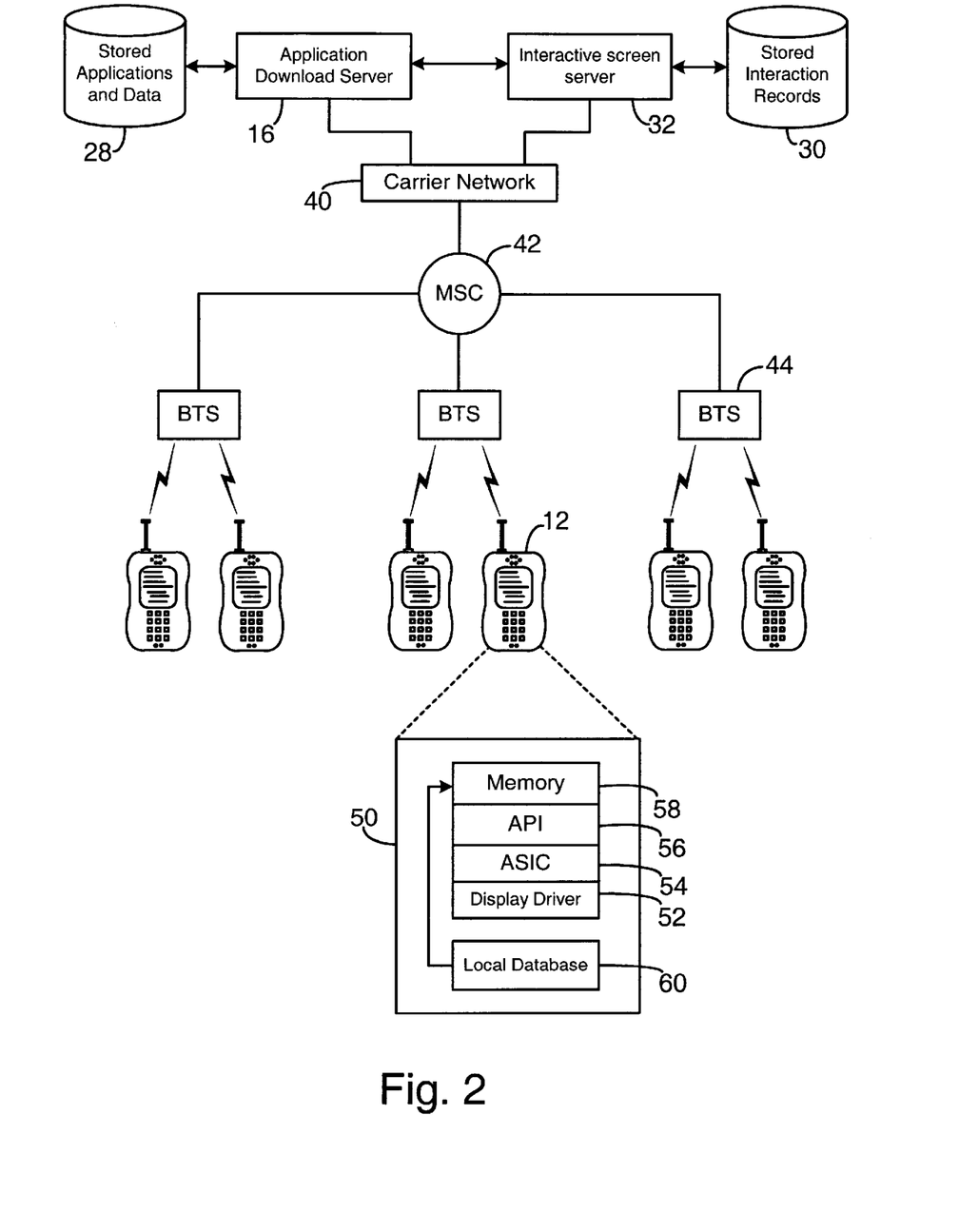
FIG. 2 is a block diagram of the hardware components of the wireless network providing communication between different wireless devices, an application download server, a separate interactive screen server, and their respective databases.

FIG. 2 is a block diagram that more fully illustrates the components of the wireless network 14 and interrelation of the elements of the system 10. The wireless network 14 is merely exemplary and can include any system whereby remote modules, such as wireless devices 12,18,20,22, communicate over-the-air between and among each other and/or between and among components of a wireless network 14, including, without limitation, wireless network carriers and/or servers, as well as including a non-wireless network alone or in combination with a wireless network. The application download server 16 and the stored applications database 28, interactive screen server 32, and stored interaction records database 30, will be present on the cellular data network with any other components that are needed to provide cellular telecommunication services. The application download server 16, interactive screen server 32, and/or other screen servers communicate with a carrier network 40, through a data link, such as the Internet, a secure LAN, WAN, or other network. The carrier network 40 controls messages (generally being data packets) sent to a messaging service controller ("MSC") 42. The carrier network 40 communicates with the MSC 42 by a network, the Internet and/or POTS ("plain ordinary telephone system"). Typically, the network or Internet connection between the carrier network 40 and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

The wireless device, such as cellular telephone 12, has a computer platform 50 that can receive and execute software applications and display data transmitted from the application download server 16. The computer platform 50 also allows the wireless device to interact with data and applications resident on network servers. The computer platform 50 may include, among other components, a display driver 52 that drives the graphics display 13 and renders images on the graphics display 13 based upon graphics data received at the computer platform 50. The computer platform 50 also includes an application-specific integrated circuit ("ASIC") 54, or other processor, microprocessor, logic circuit, or other data processing device. The ASIC 52 or other processor executes the application programming interface ("API") layer 56 that interfaces with any resident programs in the memory 58 of the wireless device. The memory can be comprised of read-only or random-access memory (RAM and ROM), EPROM, EEPROM, flash cards, or any memory common to computer platforms. The computer platform 50 also includes a local database 60 that can hold the software applications not actively used in memory 58, such as the software applications downloaded from the application download server 16. The local database 60 is typically comprised of one or more flash memory cells, but can be any secondary or tertiary storage device as known in the art, such as magnetic media, EPROM, EEPROM, optical media, tape, or soft or hard disk.

The wireless device, such as cellular telephone 12, can access and download many types of applications, such as games and stock monitors, or simply data such as news and sports-related data. The downloaded data can be immediately displayed on the display or stored in the local database 60 when not in use. The software applications can be treated as a regular software application resident on the wireless device 12,18,20,22, and the user of the wireless device can selectively upload stored resident applications from the local database 60 to memory 58 for execution on the API 56. The end-user of the wireless device 12,18,20,22 can also selectively delete a software application from the local database 60.

Figure 3A:
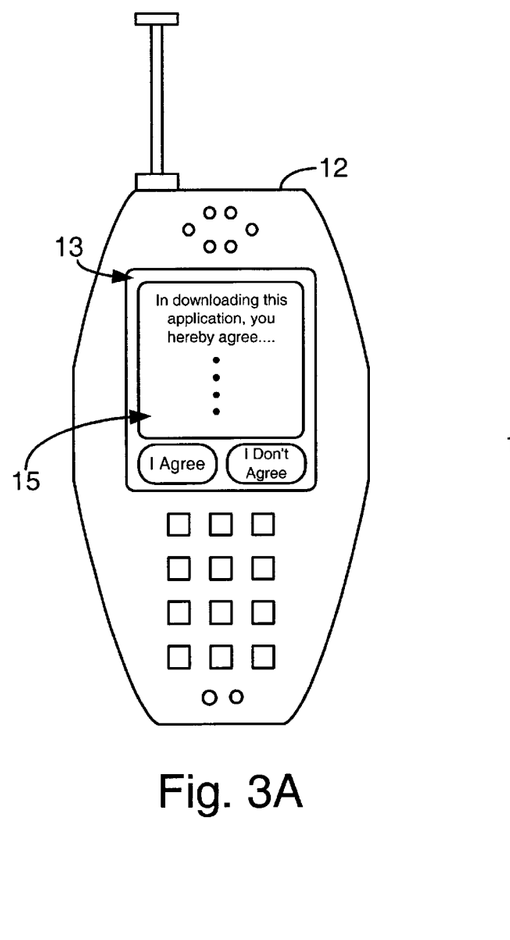
FIG. 3A is a perspective view of the graphic display of a cellular telephone displaying a EULA to the user upon the user seeking to download an application.
Figure 3B:
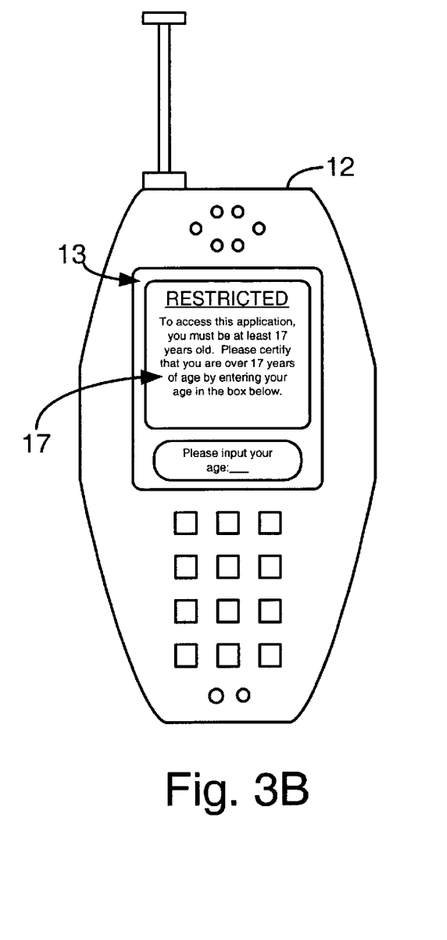
FIG. 3B is a perspective view of the graphic display of a cellular telephone displaying a age-verification to the user upon the end-user seeking to download an age-restricted application, and the user is requested to enter their age on the form.

As shown in FIGS. 3A and 3B, the system 10 displays an interactive screen 15,17 on the graphic display 13 of a wireless device, such as cellular telephone 12, upon the wireless device attempting to access or download data from a network server, such as application download server 16 across the wireless network 14. The system 10 transmits an interactive screen to the computer platform 50 of the wireless device, either from the server containing the request application or data or from a second server such as interactive screen server 32. The interactive screen 15,17 will appear to the user on the graphic display prior to the network server downloading or allowing access to the requested data or application. The operator of the network server can thus control the access of the wireless device 12,18,20,22 to individual applications and data through using the interactive screen 15,17. As an example, in FIG. 3A, an end-user license agreement (EULA) interactive screen 15 is displayed to the end-user on the graphic display 13 when the user seeks to download a software application from application download server 16. The user must indicate agreement with the EULA in order to download the application, and can interact with the EULA 15 on the API 56 of the computer platform. Typical APIs provide a movable cursor on the display that can activate icons as is well known in the art, and other graphic-user interfaces can be used such as a touch screen and stylus that is common in PDA interfaces. Whatever the end-user inputs in response to the EULA is signaled back to the application download server 16, either directly from the cellular telephone 12 or indirectly from a signal sent by interactive screen server 32 indicating the user interaction.

As another example of an interactive screen, FIG. 3B illustrates an age verification form 17 that requires the user to input their age prior to being granted access to age-restricted material on the network server. The user thus enters his/her age in response the screen and the cellular telephone transmits the input data to an appropriate network server, such as application download server 16 or interactive screen server 32. Some processing can occur either at the server where the data is requested or at the interactive screen server 32 to determine if the input age meets the criteria. If the interactive screen server 32 processes the data, it can transmit an affirmative or negative signal to the requested-data server to authorize the access of the wireless device.

While the interactive screen 15,17 can be transmitted to the wireless device 12,18,20,22 from the network server that the wireless device attempted to access or download data from, one embodiment includes the use of another network server, such as interactive screen server 32 and an associated stored interaction records database 30, to conserve the resources on pure application servers such as application download server 16. Thus, upon a wireless device 12,18,20,22 attempting to download or access data or an application on a first network server across the wireless network 14, such as application download server 16, the interactive screen is transmitted to the wireless device 12,18,20,22 from a second network server, such as interactive screen server 32, across the wireless network 14. In such embodiment, once the user of the wireless device 12,18,20,22 interacts with the interactive screen displayed on the graphic display 13,19,21,23 of the wireless device 12,18,20,22, the wireless device sends the signal indicating the interaction to the second network server (interactive screen server 32), and the second network server sends a signal to the first network server (application download server 16) indicating the interaction at the wireless device such that the first network server is now allowed to provide access or download the requested data or application to the computer platform 50 of the wireless device 12,18,20,22. If the interactive screen requires input of data, such as verification form 17 in FIG. 3B, once the end-user of the wireless device 12,18,20,22 inputs data on the interactive screen, the wireless device 12,18,20,22 sends the input data to the second network server (interactive screen server 32), the second network server again sends a signal to the first network server (application download server 32) indicating the input of data at the wireless device 12,18,20,22, and that the first network server can provide access or downloading the requested data or application. The use of the interactive screen server 32 as a second network server allow faster provision of the interactive screen and storage of interaction records, especially with a stored interaction records database 30, than would be possible with all functionality occurring on a single network server, such as application download server 16. The increase in system 10 speed translates to decreased data transfer time across the wireless network 14, which conserves the expensive bandwidth of the wireless network 14.

The interactive screen can be provided to the wireless device 12,18,20,22 at any interval during the wireless device-network server interaction. The system 10 can transmit the interactive screen to the wireless device to block access to a specific application, a dataset, or even a file level on the network server (data may be held on a network server in a file structure such as in Windows, UNIX, and LINUX). Further, the transmission of the interactive screen can occur at any time an application or data is sought accessed or downloaded by a wireless device, or if a one-time EULA was necessary, a record of the wireless device 12,18,20,22 execution of the EULA can be stored, for example on stored interaction records database 30. A comparison can be made by a network server, such as the interactive screen server 32, when a wireless device seeks to download an application or data and if the wireless device has a EULA stored, then the interaction screen provision is unnecessary and the system 10 can let the download proceed.

Figure 4:
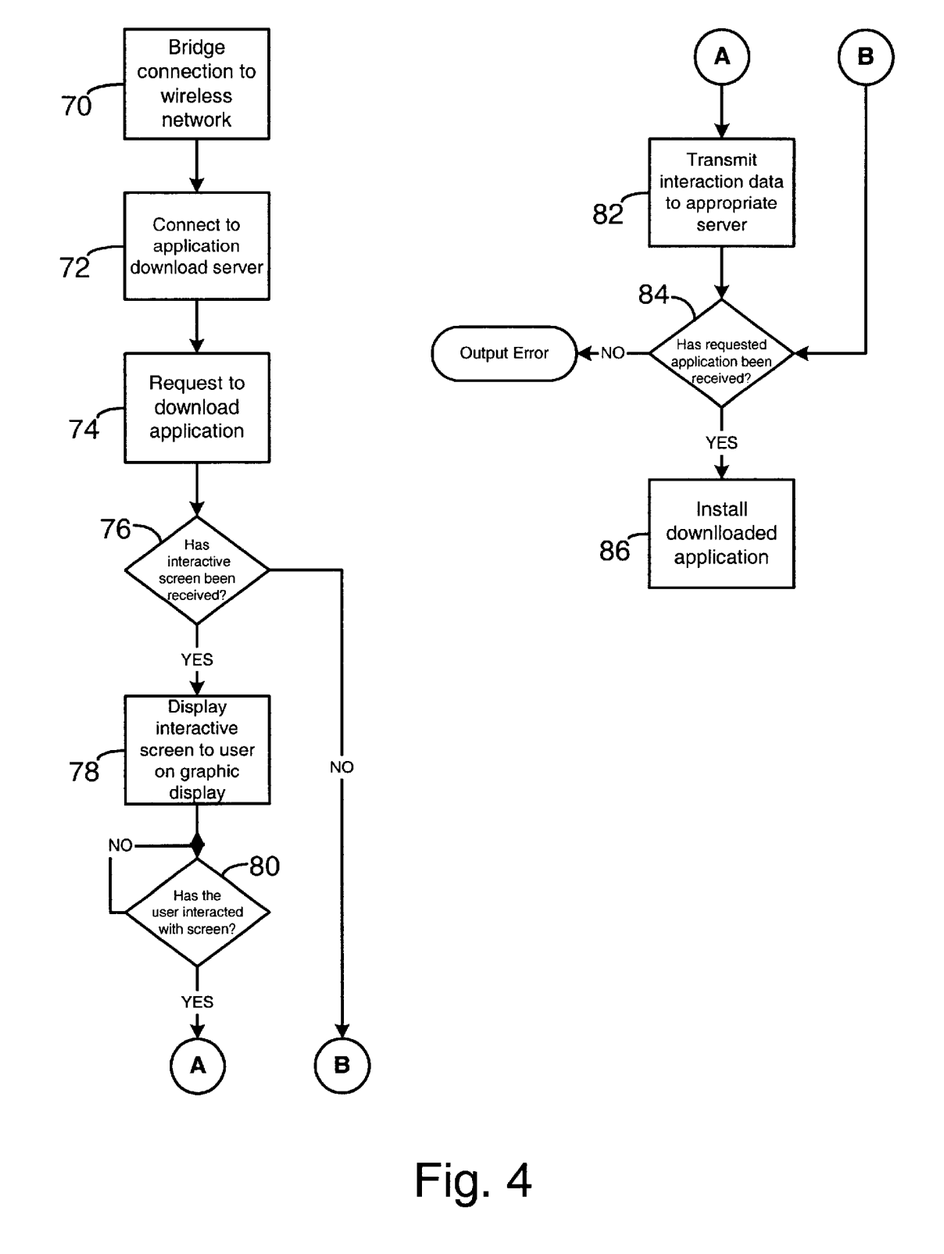
FIG. 4 is a flowchart illustrating the process executing on the wireless device computer platform to attempt to download and application from a network server, and receiving and displaying an interactive screen to the user, transmitting the interaction data to the network server, and downloading the application.

In one exemplary embodiment, the process executed on the computer platform 50 of the wireless device 12,18,20,22 is shown in the flowchart of FIG. 4. The wireless device, such as cellular telephone 12, bridges a connection to the wireless network 14, as shown at step 72, such as a cellular network, and then connects to a network server, such as application download server 16, as shown at step 72. At some point while connected to the application download server 16, the wireless device will request to download an application, as shown at step 74, or will seek to otherwise access data that has limited access. Thus, after the request is made at step 74, a decision is made as to whether an interactive screen 15,17 has been received at the computer platform 50 of the wireless device, as shown by decision 50. If an interactive screen 15,17 has not been received, then the process proceeds to determine if the requested application has been received at decision 84. Otherwise, if the interactive screen 15,17 has been received at decision 76, the interactive screen 15,17 is displayed on the graphic display 13,19,21,23 of the wireless device 12,18,20,22 as shown at step 78.

After the interactive screen 15,17 is displayed, a decision is made as to whether the user has interacted with the interactive screen 15,17, as shown at decision 80, or in other words, the wireless device waits until the user interacts with the interactive screen 15,17 so it can send a signal and/or data back to the interactive screen transmitting network server, such as application download server 16 or interactive screen server 32. If the user has not interacted with the interactive screen 15,17 at decision 80, the process reenters decision 80 in a wait-state until the user does interact with the interactive screen 15,17 or exits the download request. If the user has interacted with the interactive screen 15,17 at decision 80, then the interaction data or a signal is transmitted from the wireless device 12,18,20,22 to the appropriate network server, as shown at step 82.

A decision is then made as to whether the request application has been received at the computer platform 50 of the wireless device 12,18,20,22 (or that the requested access has been granted), as shown at decision 84. If the application has not been received (or access has not been granted) at decision 84, then the process is terminated as the download (or access) was unsuccessful. If the application was successfully received at decision 84, the application is installed at the wireless device 12,18,20,22 as shown at step 86. If the request was for access to data or applications on the network server, then the wireless device 12,18,20,22 will have access to the data or applications.

Figure 5:
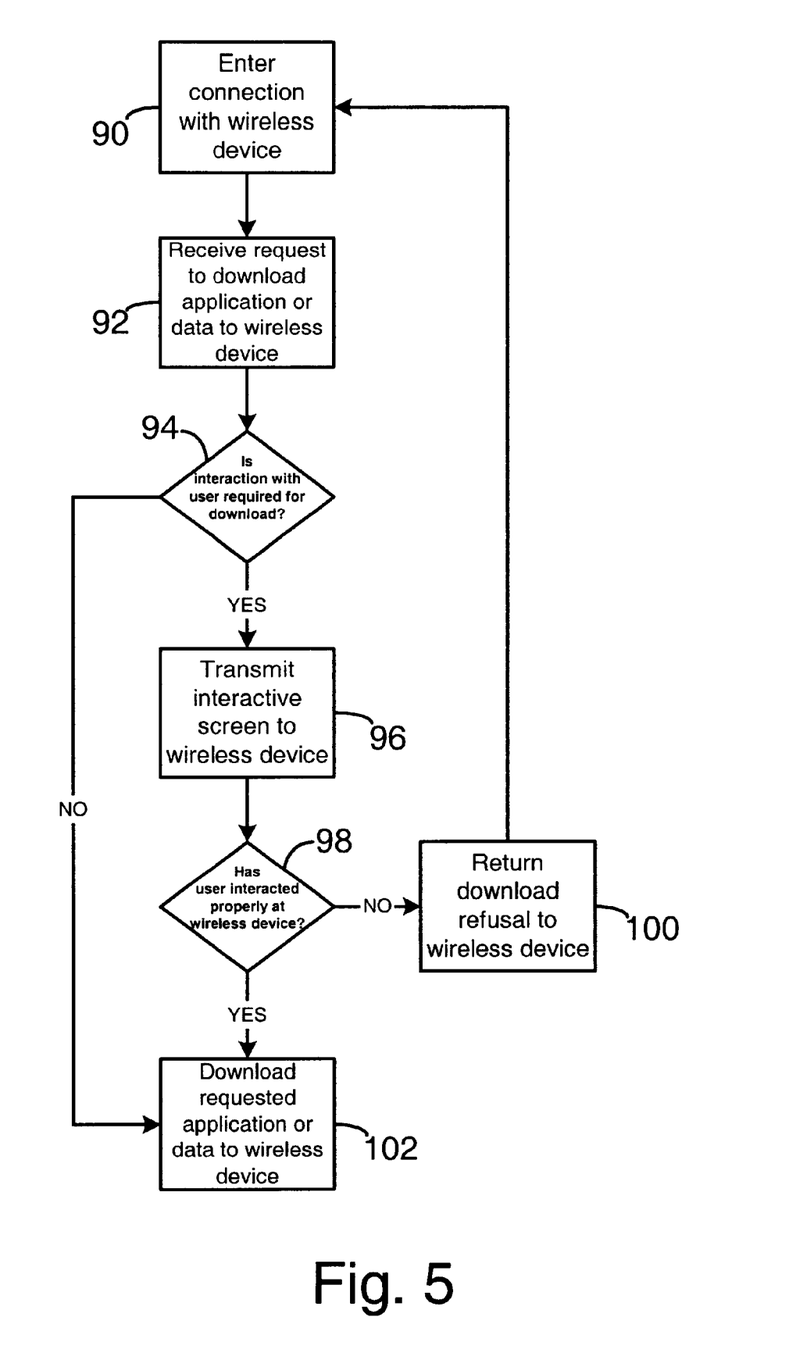
FIG. 5 is a flowchart illustrating the process executing on the application download server receiving a download request from the wireless device in FIG. 4, transmitting an interactive screen to the wireless device, and awaiting the user to properly interact with the interactive screen before allowing the wireless device to download the requested application.

With reference to FIG. 5, an exemplary embodiment of the process executing on the application download server 16 (or other type of network server) is shown in a flowchart. A connection with the wireless device 12,18,20,22 is entered, as shown at step 90. At some point, the application download server 16 will received a request from the wireless device 12,18,20,22 to download an application or access resident data, as shown at step 92. Once the request is received at the application download server 16, it is determined if interaction with the wireless device user is required, as shown at decision 94. The determination can be made based upon any criteria that the operator of the network server chooses, such as the owner or the wireless device, the nature of the subject matter of the application or data requested accessed or downloaded. If an interaction with the wireless device user is not required at decision 94, then the requested application is downloaded to the wireless device 12,18,20,22, as shown at step 102. If interaction is required at decision 94, then an interactive screen 15,17 is transmitted to the wireless device 12,18,20,22, necessitating that the user interact with the interactive screen 15,17 before the requested download (or access) is permitted.

A determination is then made as to whether the wireless device user has properly interacted with the interactive screen 15,17, such as affirmatively entering a EULA (FIG. 3A) or entering a correct age (FIG. 3B), as shown at decision 98. The interaction signal or data can be sent either directly from the wireless device 12,18,20,22 requesting the application and displaying the interactive screen 15,17, or can be a signal or data sent from a second network server, such as interactive screen server 32 which originally received the interaction signal or data from the wireless device. If the wireless device user has not properly interacted with the interactive screen 15,17 at the wireless device 12,18,20,22, at decision 98, a notice of refusal to download the application to the wireless device 12,18,20,22 (or denial of access) is returned to the requesting wireless device, as shown at step 100. If the wireless device user has properly interacted with the interactive screen 15,17 at the wireless device 12,18,20,22, at decision 98, then the requested application is downloaded to the wireless device (or access to the requested application granted), as shown at step 102.

The system 10 thus provides a method for displaying an interactive screen 15,17 on the graphic display 13,19,21,23 of a user-interactive wireless device 12,18,20,22 including attempting to download or access data on a network server, such application download server 16, across the wireless network 14, transmitting a interactive screen 15,17 to the computer platform 50 of the wireless device 12,18,20,22 across the wireless network 14 prior to downloading or accessing the requested data or application, and displaying the interactive screen 15,17 on the graphic display 13,19, 21,23 of the wireless device 12,18,20,22. The method can also include interacting with the interactive screen 15,17 at the wireless device 12,18,20,22, sending a signal to the network server (application download server 16 or interactive screen server 32) from the wireless device 12,18,20,22 indicating the interaction, and downloading or accessing the requested data or application at the network server with the computer platform 50 of the wireless device 12,18,20,22. If the interactive screen 15,17 allows wireless device user input of data, the method further comprises the steps of inputting data on the interactive screen 15,17 displayed on the graphic display 13,19,21,23 of the wireless device 12,18, 20,22, sending the inputted data from the wireless device 12,18,20,22 to the network server, processing the input data at the network server, and selectively downloading or granting access to the requested data or application at the network server.

Transmitting an interactive screen 15,17 to the wireless device 12,18,20,22 across the wireless network 14 can include transmitting an interactive screen 15,17 to the wireless device 12,18,20,22 from a first network server (such as application download server 16) that the wireless device requested to download or access and application or data, or can be transmitting an interactive screen 15,17 from a second network server (such as an interactive screen server 32) across the wireless network 14. If the interactive screen server 32 is used to provide the interactive screen 15,17 to the wireless device, the method can include the steps of interacting with the interactive screen 15,17 displayed on the graphic display 13,19,21,23 of the wireless device, sending a signal from the wireless device to the second network server indicating the interaction, sending a signal from the second network server (such as interactive screen server 32) to the first network server (such as application download server 16) indicating the interaction at the wireless device 12,18,20,22, and downloading or accessing the requested data or application resident at the first network server to the computer platform 50 of the wireless device 12,18,20,22. And if the interactive screen 15,17 allows wireless device user input of data at the wireless device 12,18,20,22, the method can further include inputting data on the interactive screen (such as verification form 17 in FIG. 3B) displayed on the graphic display 13,19,21,23 of the wireless device 12,18,20,22, sending the input data from the wireless device to the second network server (such as interactive screen server 32), sending a signal from the second network server to the first network server (such as application download server 16) indicating the input of data at the wireless device 12,18,20,22, and downloading or accessing the requested data or application at the network server to the computer platform 50 of the wireless device 12,18,20,22.

The invention further includes a wireless device 12,18, 20,22 including a computer platform 50 and a graphic display 13,19,21,23 thereon, where the wireless device 12,18,20,22 in selective communication to one or more network servers across a wireless network 14 with each network server selectively downloading data and applications to the wireless device 12,18,20,22. Upon the wireless device 12,18,20,22 attempting to download or access data on a network server across the wireless network 14, the computer platform 50 of the wireless device receives an interactive screen 15,17 transmitted across the wireless network 14, and the wireless device 12,18,20,22 displaying the transmitted interactive screen 15,17 on the graphic display 13,19,21,23 thereof. If the interactive screen 15,17 allows user input of data at the wireless device 12,18,20,22, the wireless device then allows the user to input data on the interactive screen 15,17 displayed on the graphic display 13,19,21,23 of the wireless device 12,18,20,22, and the wireless device sending the inputted data to the appropriate network server (such as application download server 16 and interactive screen server 32).

Another embodiment includes a program resident in a computer readable medium, where the program directs a wireless device having a computer platform to perform the inventive steps of the method. The computer readable medium can be the memory 58 of the computer platform 50 of the cellular telephone 12, or other wireless device, or can be in a local database, such as local database 60 of the cellular telephone 12. Further, the computer readable medium can be in a secondary storage media that is loadable onto a wireless device computer platform, such as a magnetic disk or tape, optical disk, hard disk, flash memory, or other storage media as is known in the art.

In the context of FIGS. 4 and 5, the method may be implemented, for example, by operating portion(s) of the wireless network 14 to execute a sequence of machine-readable instructions, such as wireless platform 50, the application download server 16, and interactive screen server 32. The instructions can reside in various types of signal-bearing or data storage primary, secondary, or tertiary media. The media may comprise, for example, RAM (not shown) accessible by, or residing within, the components of the wireless network 14. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A system for displaying an interactive screen on the graphic display of a wireless device communicating with network server prior to download of data to the wireless device, the system comprising:

one or more user-interactive wireless devices, each wireless device including a computer platform and a graphic display thereon, and each wireless device in selective communication to a wireless network; and one or more network servers in selective communication to the wireless network, and each network server selectively in communication with the one or more wireless devices and selectively downloading applications and data to wireless devices thereto, wherein, upon a wireless device attempting to download data from a network server across the wireless network, the system transmitting an interactive screen to the computer platform of the wireless device across the wireless network prior to downloading the data to the wireless device, and the wireless device displaying the interactive screen on the graphic display thereof, wherein the interactive screen is transmitted to the wireless device from a first network server that the wireless device attempted to download data from, wherein upon a wireless device attempting to download data from a first network server across the wireless network, the interactive screen is transmitted to the wireless device from a second network server across the wireless network.

2. The system of claim 1, wherein, upon the user of the wireless device interacting with the interactive screen displayed on the graphic screen of the wireless device, the wireless device sending a signal to the second network server indicating the interaction, the second network server sending a signal to the first network server indicating the interaction at the wireless device, and the first network server downloading the requested data to the computer platform of the wireless device.

3. The system of claim 1, wherein the interactive screen allows user input of data at the wireless device, and upon the user of the wireless device inputting data on the interactive screen displayed on the graphic screen of the wireless device, the wireless device sending the input data to the second network server, the second network server sending a signal to the first network server indicating the input of data at the wireless device, and the first network server downloading the requested data to the computer platform of the wireless device.

4. A method for displaying an interactive screen on the graphic display of a user-interactive wireless devices including a computer platform, the wireless device selectively communicating with a network server and downloading applications and data therefrom, the method comprising:

attempting to download data to the wireless device from the network server across the wireless network;

transmitting a interactive screen to the computer platform of the wireless device across the wireless network prior to downloading the data to the wireless device; and displaying the interactive screen on the graphic display of the wireless device, wherein attempting to download data to the wireless device from the network server across the wireless network includes attempting to download data to the wireless device from a first network server across the wireless network, wherein, transmitting an interactive screen to the wireless device across the wireless network includes transmitting an interactive screen to the wireless device from a second network server across the wireless network.

5. The method of claim 4, further comprising:

interacting with the interactive screen displayed on the graphic screen of the wireless device;

sending a signal from the wireless device to the second network server indicating the interaction;

sending a signal from the second server to the first network server indicating the interaction at the wireless device; and downloading the requested data from the first network server to the computer platform of the wireless device.

6. The method of claim 4, wherein the interactive screen allows user input of data at the wireless device, and further comprising:

inputting data on the interactive screen displayed on the graphic screen of the wireless device;

sending the input data from the wireless device to the second network server;

sending a signal from the second network server to the first network server indicating the input of data at the wireless device; and downloading the requested data from the first network server to the computer platform of the wireless device.

* * * * *